(12) United States Patent
Shi et al.

(10) Patent No.: US 10,112,307 B2
(45) Date of Patent: Oct. 30, 2018

(54) PART HOLDING ASSEMBLY, AN ASSEMBLY SYSTEM AND A METHOD OF POSITIONING A FIRST PART

(71) Applicant: GM GLOBAL TECHNOLOGY OPERATIONS LLC, Detroit, MI (US)

(72) Inventors: Jianying Shi, Oakland Township, MI (US); John Patrick Spicer, Plymouth, MI (US); Lance T. Ransom, Essex (CA)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 14/830,281

(22) Filed: Aug. 19, 2015

(65) Prior Publication Data

US 2016/0052148 A1    Feb. 25, 2016

Related U.S. Application Data

(60) Provisional application No. 62/041,251, filed on Aug. 25, 2014.

(51) Int. Cl.
*B23P 19/00* (2006.01)
*B25J 15/06* (2006.01)
(Continued)

(52) U.S. Cl.
CPC ........ *B25J 15/0608* (2013.01); *B23Q 3/1543* (2013.01); *B23Q 3/18* (2013.01); *B25J 15/009* (2013.01); *B25J 15/0052* (2013.01)

(58) Field of Classification Search
CPC .............................. B25B 11/00; B25B 11/002
See application file for complete search history.

(56) References Cited

U.S. PATENT DOCUMENTS

| | | | |
|---|---|---|---|
| 4,589,184 A | 5/1986 | Asano et al. | |
| 4,631,815 A | 12/1986 | Bocchicchio et al. | |
| 5,066,936 A * | 11/1991 | Hsu ...................... | B23Q 3/1546 269/8 |

(Continued)

FOREIGN PATENT DOCUMENTS

| | | |
|---|---|---|
| CN | 2717610 Y | 8/2005 |
| CN | 201158031 Y | 12/2008 |

(Continued)

OTHER PUBLICATIONS

Goudsmit Magnetic Systems, brochure entitled "Magnet Grippers"; accessed on Aug. 14, 2014; 4 pages.

(Continued)

*Primary Examiner* — Lee D Wilson
(74) *Attorney, Agent, or Firm* — Quinn IP Law

(57) ABSTRACT

A part holding assembly, an assembly system and a method of positioning a first part are disclosed. The part holding assembly is coupleable to a support structure. The part holding assembly includes a base adapted to be coupled to the support structure. The part holding assembly also includes a first pin extending outwardly away from the base to a distal end that is spaced from the base. The base is movable to position the first pin relative to a first part and to insert the distal end of the first pin through a first hole of the first part to locate the first part. The part holding assembly further includes a first magnet adjacent to the first pin. The first magnet is selectively magnetized to selectively secure the position of the first part relative to the base.

19 Claims, 4 Drawing Sheets

(51) Int. Cl.
*B23Q 3/154* (2006.01)
*B23Q 3/18* (2006.01)
*B25J 15/00* (2006.01)

(56) References Cited

U.S. PATENT DOCUMENTS

| | | | |
|---|---|---|---|
| 5,608,847 A | 3/1997 | Pryor et al. | |
| 5,816,568 A | 10/1998 | Fox | |
| 6,163,946 A | 12/2000 | Pryor et al. | |
| 6,367,788 B1 | 4/2002 | Babchuk | |
| 7,290,760 B1 | 11/2007 | Lindsay | |
| 8,025,277 B2 | 9/2011 | Lin et al. | |
| 9,808,933 B2 | 11/2017 | Lin et al. | |
| 2008/0274865 A1 | 11/2008 | Sturm | |
| 2009/0193642 A1 | 8/2009 | Lin et al. | |
| 2009/0273130 A1 | 11/2009 | Armstrong et al. | |
| 2013/0106127 A1 | 5/2013 | Lipson et al. | |
| 2013/0298382 A1* | 11/2013 | Yamashita | H05K 13/0061 29/559 |
| 2014/0044237 A1 | 2/2014 | Ferrer et al. | |
| 2016/0052148 A1* | 2/2016 | Shi | B25J 15/0608 29/559 |
| 2017/0050280 A1 | 2/2017 | Shi et al. | |
| 2017/0050323 A1 | 2/2017 | Shi et al. | |

FOREIGN PATENT DOCUMENTS

| | | |
|---|---|---|
| CN | 101479437 A | 7/2009 |
| CN | 201544151 U | 8/2010 |
| CN | 102152162 A | 8/2011 |
| CN | 102267114 A | 12/2011 |
| CN | 102581632 A | 7/2012 |
| CN | 202622683 U | 12/2012 |
| CN | 203738183 U | 7/2014 |
| CN | 104668857 A | 6/2015 |
| CN | 104669016 A | 6/2015 |
| DE | 219721 A1 | 3/1985 |
| DE | 102009050119 A1 | 5/2010 |
| DE | 102014202257 A1 | 8/2014 |
| EP | 2732926 A1 | 5/2014 |
| JP | 2009-90442 A | 4/2009 |
| JP | 2010201517 A | 9/2010 |

OTHER PUBLICATIONS

Webpage entitled "Nitrogen Gas Springs" from the website: http://www.asraymond.com/nitrogen-springs.html; accessed on Jul. 29, 2015; 4 pages.

* cited by examiner

PART HOLDING ASSEMBLY, AN ASSEMBLY SYSTEM AND A METHOD OF POSITIONING A FIRST PART

CROSS-REFERENCE TO RELATED APPLICATIONS

This application claims the benefit of U.S. Provisional Application No. 62/041,251, filed on Aug. 25, 2014, which is hereby incorporated by reference in its entirety.

TECHNICAL FIELD

The present disclosure relates to a part holding assembly coupleable to a support structure, an assembly system and a method of positioning a first part.

BACKGROUND

An assembled device comprises a multitude of structural components that are assembled to one another with sufficient precision for desired function and aesthetics. The assembled device includes multiple subassemblies each having a number of subcomponents. Typically, dedicated fixtures are designed for presenting and positioning each subcomponent relative to one or more other subcomponents to which the subcomponent is to be assembled. The dedicated fixtures are customized for a particular subcomponent and therefore have limited adjustability. These fixtures require an extended lead time and significant capital investment to design and manufacture prior to use in assembling the subcomponents. The assembled device can be a vehicle, home appliances, furniture, an aircraft, a watercraft, etc.

Generally, the holes through the various subcomponents are not standardized; therefore, separate individual dedicated grippers are utilized to move each different subcomponent. In other words, one dedicated gripper is utilized for one particular configuration of a subcomponent while another dedicated gripper is utilized for another particular configuration of another subcomponent. Therefore, specific grippers have to be designed for each particular subcomponent which requires lead time and capital investment. As such, the dedicated grippers have limited adjustability.

SUMMARY

The present disclosure provides a part holding assembly coupleable to a support structure. The part holding assembly includes a base adapted to be coupled to the support structure. The part holding assembly also includes a first pin extending outwardly away from the base to a distal end that is spaced from the base. The base is movable to position the first pin relative to a first part and to insert the distal end of the first pin through a first hole of the first part to locate the first part. The part holding assembly further includes a first magnet adjacent to the first pin. The first magnet is selectively magnetized to selectively secure the position of the first part relative to the base.

The present disclosure also provides an assembly system including a support structure and a part holding assembly. The support structure includes an attachment member. The part holding assembly is coupled to the attachment member. The part holding assembly includes a base secured to the attachment member and a first pin extending outwardly away from the base to a distal end that is spaced from the base. The base is movable by the attachment member to position the first pin relative to a first part and to insert the distal end of the first pin through a first hole of the first part to locate the first part. The part holding assembly further includes a first magnet adjacent to the first pin. The first magnet is selectively magnetized to selectively secure the position of the first part relative to the base.

The present disclosure further provides a method of positioning a first part. The method includes positioning a part holding assembly relative to the first part. The part holding assembly includes a base, a first pin extending outwardly away from the base to a distal end that is spaced from the base, and a first magnet adjacent to the first pin. The method further includes inserting the distal end of the first pin through a first hole of the first part to locate the first part and magnetizing the first magnet to secure the first part to the part holding assembly.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
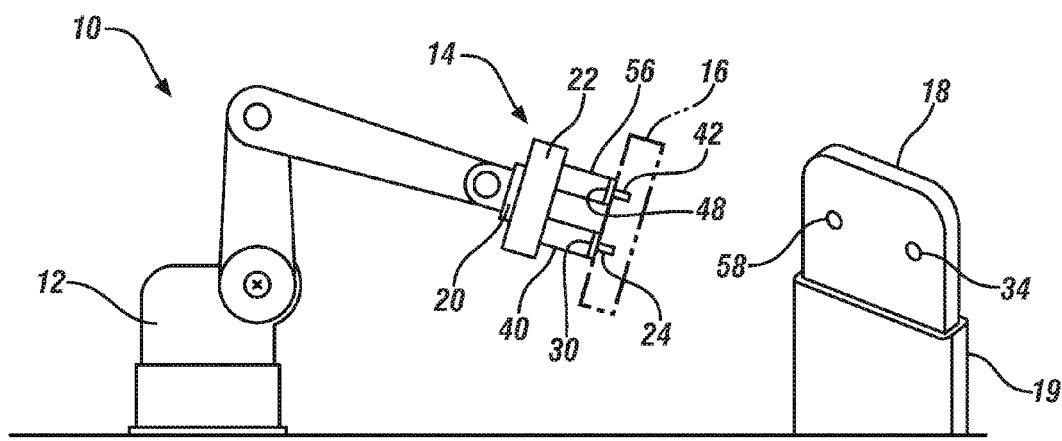
FIG. 1 is a schematic perspective view of an assembly system and a part holding assembly coupled to a support structure.

Referring to the Figures, wherein like numerals indicate like or corresponding parts throughout the several views, an assembly system 10 including a support structure 12 is generally shown in FIG. 1 with a part holding assembly 14 coupled to the support structure 12.

The part holding assembly 14 is coupleable to the support structure 12. Therefore, the part holding assembly 14 can be removed from the support structure 12 when desired. The part holding assembly 14 can be utilized to position a first part 16 during assembly. The support structure 12 can be a stationary fixture, a frame, a robotic device, etc. When the support structure 12 is the robotic device (as shown in FIG. 1), the robotic device can utilize the part holding assembly 14 to locate and move the first part 16 to a desired location/orientation, details of which are discussed further below.

The part holding assembly 14 can be utilized to position the first part 16 and a base part 18 relative to each other during assembly. Therefore, the assembly system 10 can include the first part 16 and the base part 18, the support structure 12 and the part holding assembly 14. For example, the robotic device can position the base part 18 such that another robotic device can pick up another part, such as the first part 16, and position that first part 16 relative to the base part 18. Meaning, one robotic device with one part holding assembly 14 can act as a fixture to support the base part 18 while another robotic device with another part holding assembly 14 can clamp the first part 16 to the base part 18. Alternatively, a stationary fixture 19 (see FIG. 1) can be utilized to support the base part 18 and the robotic device with the part holding assembly 14 can position the first part 16 relative to the base part 18 to clamp together the base part 18 and the first part 16. In yet another alternative, the part holding assembly 14 can be secured to the stationary fixture 19 and the base part 18 can be placed on that part holding assembly 14, then the robotic device with another part holding assembly 14 can clamp the first part 16 to the base part 18.

When utilizing one or more robotic devices, the robotic device(s) can include a controller. The controller can include a processor and a memory on which is recorded instructions for controlling the robotic device(s). The controller is configured to execute the instructions from the memory, via the processor. For example, the controller can be a host machine or distributed system, e.g., a computer such as a digital computer or microcomputer, and/or as a proportional-integral-derivative (PID) controller device having a processor, and, as the memory, tangible, non-transitory computer-readable memory such as read-only memory (ROM) or flash memory. The controller can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller can include all software, hardware, memory, algorithms, connections, sensors, etc., necessary to control the robotic device(s).

The first part 16 and the base part 18 can be any suitable configuration. Examples of different configurations of the first part 16 are shown in FIGS. 1, 2, 7, 9 and 10. In certain embodiments, the first part 16 and the base part 18 can be components of a vehicle, such as body components or body panels. For example, the first part 16, the base part 18 or any other body components, can weigh from about 0.5 pounds to about 15.0 pounds. The above range is one non-limiting example, and the weight of the first part 16 can be less than 0.5 pounds or greater than 15.0 pounds. The part holding assembly 14 can be utilized with many different configurations of the first part 16 and the base part 18 which can provide cost and time savings, as well as provide a range of adjustability.

Continuing with FIG. 1, the support structure 12 can include an attachment member 20. Generally, the part holding assembly 14 can be coupled to the attachment member 20. The attachment member 20 can be any suitable configuration to support the part holding assembly 14. For the robotic device embodiment, movement of the attachment member 20 correspondingly moves the part holding assembly 14.

Referring to FIG. 1, the part holding assembly 14 includes a base 22 adapted to be coupled to the support structure 12. For example, the base 22 is secured to the robotic device such that during movement of the robotic device the part holding assembly 14 moves accordingly. In certain embodiments, the base 22 is secured to the attachment member 20. The base 22 can be secured to the attachment member 20 by any suitable methods, such as for example, one or more fasteners, clips, snaps, locks, tabs, etc.

Figure 2:
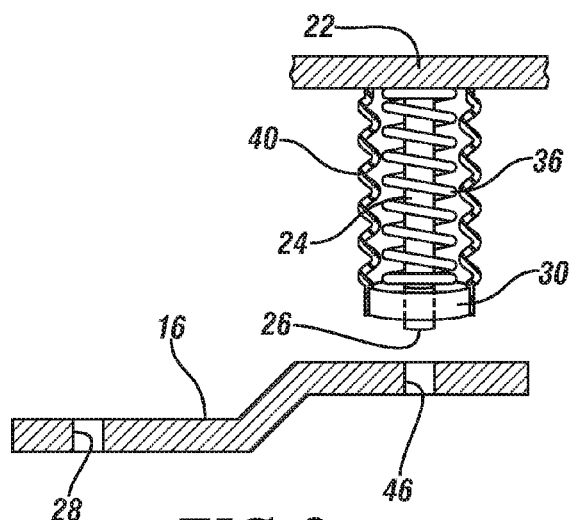
FIG. 2 is a schematic fragmentary partial cross-sectional view of the part holding assembly illustrating a first sub-assembly.
Figure 3:
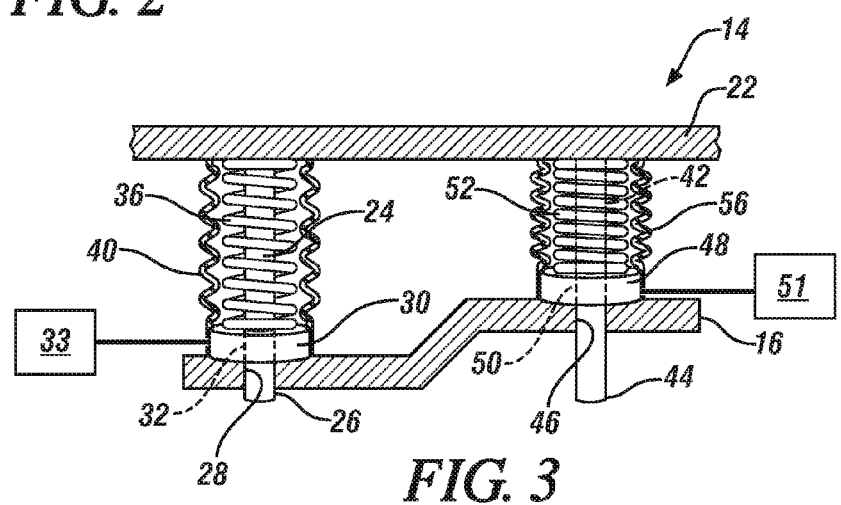
FIG. 3 is a schematic partial cross-sectional view of the part holding assembly with a first pin through a first hole of a first part and a second pin through a second hole of the first part.
Figure 4:
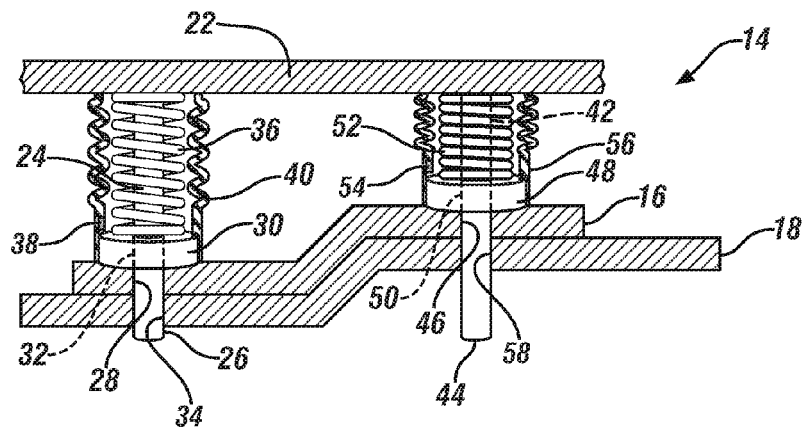
FIG. 4 is a schematic partial cross-sectional view of the part holding assembly with the first pin through the first hole of the first part and a first aperture of a base part, and the second pin through the second hole of the first part and a second aperture of the base part.

Referring to FIGS. 2-4, the part holding assembly 14 further includes a first locating feature, such as a first pin 24 extending outwardly away from the base 22. In certain embodiments, the first pin 24 is fixed to the base 22, and in other embodiments, the first pin 24 is coupled to the base 22 and is movable relative to the base 22. The first pin 24 extends to a distal end 26 that is spaced from the base 22. The base 22 is movable to position the first pin 24 relative to the first part 16 and to insert the distal end 26 of the first pin 24 through a second locating feature, such as a first hole 28 of the first part 16 to locate the first part 16. FIG. 3 illustrates the first pin 24 inserted through the first hole 28 of the first part 16. The base 22 can be movable by the attachment member 20 to position the first pin 24 relative to the first part 16 and to insert the distal end 26 of the first pin 24 through the first hole 28 of the first part 16 to locate the first part 16.

The first and second locating features are locations that are utilized to locate the first part 16. The first and second locating features can be any suitable configuration, with pins and holes being non-limiting examples. The second locating feature can be a hole 28, a slot, a corner, etc. For example, when utilizing the first hole 28 to locate the first part 16, the first hole 28 is not a hole that a fastener, a bolt, etc. is disposed through to secure the first part 16 to another part (such as the base part 18). In other words, the first hole 28 is only utilized for locating the first part 16. Therefore, the controller can be programed to move the part holding assembly 14 to a particular position to locate the first part 16 via the first pin 24 and the first hole 28.

The first pin 24 is formed of a material that is substantially non-magnetic, such as for example, non-ferrous metal, austenitic stainless steel, aluminum, copper, etc. One suitable austenitic stainless steel for the first pin 24 is annealed, type 316 stainless steel.

Referring back to FIG. 2, the part holding assembly 14 also includes a first magnet 30 adjacent to the first pin 24. In certain embodiments, the first magnet 30 is movably coupled to the first pin 24. The first magnet 30 is selectively magnetized to selectively secure the position of the first part 16 relative to the base 22. Once the position of the first part 16 is secured relative to the base 22 by the magnetism of the first magnet 30, the robotic device can move the first part 16 to another position.

As mentioned above, the first magnet 30 is adjacent to the first pin 24, and therefore, the first pin 24 can be disposed through the first magnet 30 or the first magnet 30 can be disposed proximal to the first pin 24 in a spaced relationship. When the first pin 24 is disposed through the first magnet 30, the first magnet 30 can define a first opening 32 (see FIG. 5). The first magnet 30 can abut the first part 16, or can be spaced from the first part 16, to secure the first part 16 to the part holding assembly 14. When the first magnet 30 is spaced from the first part 16, the magnetic field created by the first magnet 30, when magnetized, is strong enough to secure the first part 16 to the part holding assembly 14. The first magnet 30 can be magnetized by a first activator 33 (illustrated in FIG. 3) or any suitable methods. The first activator 33 can utilize an electrical current, can move the first magnet 30 toward and away from the first part 16 or be any other suitable activator to create magnetism between the first magnet 30 and the first part 16. The first activator 33 can turn on and off the magnetism of the first magnet 30, and/or can control the strength of magnetism of the first magnet 30. Therefore, the first activator 33 can increase and decrease the strength of magnetism of the first magnet 30. The first activator 33 can include a mechanical switch and/or dial, etc. to control the magnetism of the first magnet 30. The first activator 33 is only illustrated in FIG. 3 but all of the figures which illustrate the first magnet 30 can utilize the first activator 33. In certain embodiments, the first magnet 30 can be an electromagnet. The first pin 24 is formed of a material that is substantially non-magnetic such that the first pin 24 does not interfere with the magnetism of the first magnet 30.

Referring to FIG. 4, the distal end 26 of the first pin 24 is inserted through the base part 18. Specifically, the base part 18 can define a first aperture 34, with the distal end 26 of the first pin 24 inserted through the first aperture 34 to locate the first part 16 and the base part 18 relative to each other. Generally, the distal end 26 of the first pin 24 is inserted through the first aperture 34 after the distal end 26 of the first pin 24 is inserted through the first hole 28. Therefore, the robotic device can move the first part 16 over the base part 18 with the part holding assembly 14 aligning the first part 16 and the base part 18 in the desired position.

Figure 5:
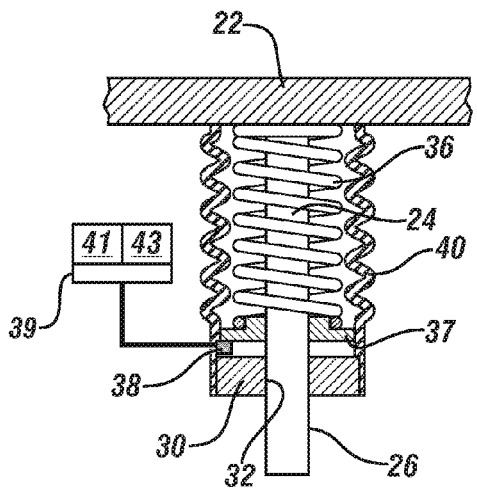
FIG. 5 is a schematic fragmentary partial cross-sectional view of the first sub-assembly with a first locking member in a first position.
Figure 6:
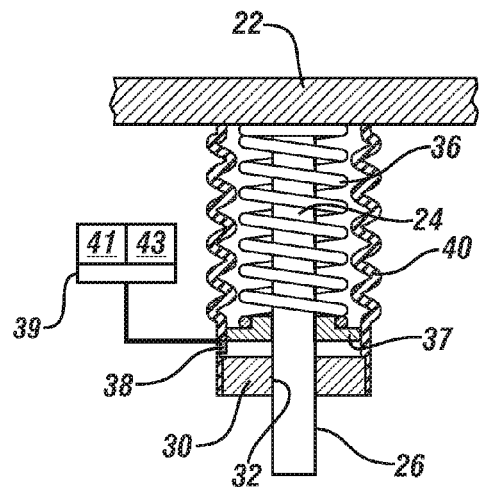
FIG. 6 is a schematic fragmentary partial cross-sectional view of the first sub-assembly with the first locking member in a second position.

As best shown in FIGS. 5 and 6, optionally, the part holding assembly 14 can also include a first biasing member 36 that applies a force to the first magnet 30 when the first part 16 is being located. The first biasing member 36 is disposed between the base 22 and the first magnet 30. As the first magnet 30 moves toward the base 22 when the first pin 24 is being inserted through the first hole 28, the first biasing member 36 applies the force to the first magnet 30 which causes engagement between the first magnet 30 and the first part 16, which can also be utilized to clamp the first part 16 to the base part 18 when the first part 16 is placed relative to the base part 18. The first biasing member 36 can be a biasing device with one or more components, a coil spring, a gas spring, a nitrogen gas spring, a die spring or any other suitable biasing member or spring. The first magnet 30 secures the first part 16 to the part holding assembly 14 from one side of the first part 16.

Optionally, the part holding assembly 14 can further include a first locking member 38 (see FIGS. 5 and 6). The first locking member 38 is movable between a first position in which the first locking member 38 restricts the first magnet 30 from biasing back and forth relative to the first pin 24 and a second position that allows the first magnet 30 to bias back and forth relative to the first pin 24 when the first part 16 is being located. The first locking member 38 can move toward the first pin 24 when in the first position and the first locking member 38 can move away from the first pin 24 when in the second position. The first position is shown in FIG. 5 and the second position is shown in FIG. 6. For example, the first locking member 38 can secure the first biasing member 36 in a predetermined position away from the first magnet 30 and the second position can release the first biasing member 36 such that the first biasing member 36 applies a force to the first magnet 30. Therefore, when the first locking member 38 is in the first position, in certain embodiments, the first biasing member 36 does not apply a force to the first magnet 30.

When switching from the second position back to the first position, the part holding assembly 14 can be disengaged from the first part 16 such that the first magnet 30 is disposed at a maximum distance from the base 22, and in this position, the first biasing member 36 can be expanded to its natural length such that there is no force applied to the first biasing member 36 that would cause the first biasing member 36 to be compressed. When the first biasing member 36 is expanded to its natural length and the first magnet 30 is disposed at its maximum distance from the base 22, the location of the first locking member 38 is between the end of the first biasing member 36 and the top of the first magnet 30 and can then be actuated back to its first position. Alternatively, the first biasing member 36 can be controlled to retract from the first magnet 30 when in the first position and release to at least partially decompress to apply the force to the first magnet 30 when in the second position. It is to be appreciated that the first locking member 38 can include one or more components and be part of a device, a mechanism, an actuator, etc. Furthermore, the first locking member 38 can be any suitable location and configuration.

Optionally, when utilizing the first biasing member 36, one or more seats 37 can support the first biasing member 36. For example, one seat 37 can be utilized to support one end of the first biasing member 36 and/or another seat 37 can be utilized to support another end of the first biasing member 36. Any of the Figures utilizing the first biasing member 36 can utilize one or more seats 37.

As discussed above, the first locking member 38 is movable between the first position in which the first locking member 38 restricts the first magnet 30 from biasing back and forth relative to the first pin 24 and the second position that allows the first magnet 30 to bias back and forth relative to the first pin 24 when the first part 16 is being located. When utilizing a seat 37 proximal to the first magnet 30, the first locking member 38 can engage the seat 37 to restrict movement of the first magnet 30 when in the first position. Alternatively, when not utilizing the seat 37, the first locking member 38 can engage the first biasing member 36 to restrict movement of the first magnet 30 when in the first position.

In other embodiments, the first biasing member 36 is coupled to the first magnet 30 and the first locking member 38 is eliminated. The first biasing member 36 retains the first magnet 30 relative to the first pin 24 and allows movement of the first magnet 30 relative to the first pin 24. The first biasing member 36 allows movement of the first magnet 30 so that the first pin 24 does not protrude excessively through the first hole 28 and/or the first aperture 34 in order to bring the first magnet 30 into direct contact or indirect engagement with the first part 16 or the base part 18. For example, the first magnet 30 can be biased outwardly by the first biasing member 36 to the distal end 26 of the first pin 24 before the first magnet 30 engages the first part 16 (best shown in FIG. 2). Once the first magnet 30 engages the first part 16, the robotic device can continue to move the part holding assembly 14 toward the first part 16 such that the first magnet 30 biases back which exposes the distal end 26 of the first pin 24 such that the first pin 24 can be inserted through the first hole 28 (best shown in FIG. 3). This movement allows the part holding assembly 14 to accommodate different thicknesses and/or different configurations of the first part 16, the base part 18 and other parts.

Figure 12:
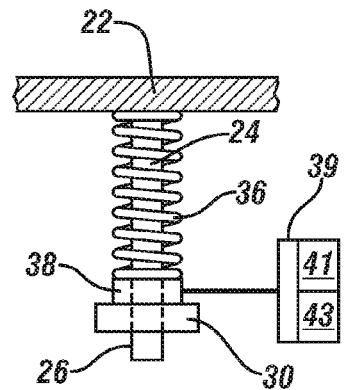
FIG. 12 is a schematic plan view of yet another configuration of the part holding assembly.

In yet other embodiments, such as FIG. 12, the first locking member 38 can be a brake that is selectively actuated to engage the first pin 24 to secure the position of the first magnet 30 relative to the first pin 24. For example, the brake can be in the first position in which the first locking member 38 restricts the first magnet 30 from biasing back and forth relative to the first pin 24 and a second position that allows the first magnet 30 to bias back and forth relative to the first pin 24 when the first part 16 is being located. Therefore, the brake can be in the first position securing the first magnet 30 in a predetermined position and the brake can be in the second position releasing the first magnet 30 such that the first magnet 30 can bias in response to the first biasing member 36. The first magnet 30 is attached to the brake such that movement of the brake correspondingly moves the first magnet 30. In other words, the brake and the first magnet 30 are attached to each other to form a unit. When the first locking member 38 is the brake, at least a portion of the brake can engage the first pin 24 when in the first position to maintain the position of the brake, and thus the first magnet 30, relative to the first pin 24 and at least the portion of the brake can disengage from the first pin 24 when in the second position to allow the position of the brake to change, and thus the first magnet 30, relative to the first pin 24.

The first locking member 38 in FIGS. 5, 6 and 12 can be in communication with a controller 39. The controller 39 can control the first locking member 38 to change the position of the brake and selectively secure the brake in a desired position relative to the first pin 24. The controller 39 can be part of an electronic control module.

The controller 39 can include a processor 41 and a memory 43 on which is recorded instructions for controlling the first locking member 38, etc. The controller 39 can control other components not specifically discussed herein and/or be in electrical communication with another controller. The controller 39 is configured to execute the instructions from the memory 43, via the processor 41. For example, the controller 39 can be a host machine or distributed system, e.g., a computer such as a digital computer or microcomputer, and/or as a proportional-integral-derivative (PID) controller device having a processor, and, as the memory 43, tangible, non-transitory computer-readable memory such as read-only memory (ROM) or flash memory. The controller 39 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 39 can include all software, hardware, memory 39, algorithms, connections, sensors, etc., necessary to control the first locking member 38, etc. As such, a control method operative to control the first locking member 38, etc. can be embodied as software or firmware associated with the controller 39. It is to be appreciated that the controller 39 can also include any device capable of analyzing data from various sensors, comparing data, making the necessary decisions required to control and monitor the first locking member 38, etc. It is to also be appreciated that more than one controller 39 can be utilized to control the components discussed above.

Continuing with FIGS. 5 and 6, the part holding assembly 14 can further include a first housing 40 supported by the base 22. The first housing 40 can surround the first pin 24 and at least partially surround the first magnet 30. The distal end 26 of the first pin 24 can protrude outside of the first housing 40 in certain embodiments. Furthermore, the first magnet 30 is movable relative to the first pin 24. The first housing 40 can be attached to the base 22 by any suitable methods, such as for example, welding, integrally formed as one piece, adhesive, fasteners, etc., or the first housing 40 can be coupled to the base 22 and is movable relative to the base 22.

The first housing 40 can be attached to the first magnet 30 and can be flexible to allow the first magnet 30 to move relative to the first pin 24 (compare FIGS. 3 and 4). The first housing 40 can be formed of a fabric, a rubber or any other suitable material that is flexible. Alternatively, the first housing 40 can be formed of a rigid material, such as metal, various plastics, etc. In yet other embodiments, the first housing 40 can be formed partially of a flexible material and partially of a rigid material. It is to be appreciated that the first housing 40 can be formed of any suitable material(s). The first housing 40 can be eliminated in the embodiment of FIG. 12.

For one of the first locking member 38 embodiments, the first locking member 38 is disposed inside the first housing 40 in the first position such that movement of the first magnet 30 relative to the first pin 24 can be impeded or restricted (see for example FIG. 5). The first locking member 38 retracts away from the inside of the first housing 40 when in the second position such that the first magnet 30 can move relative to the first pin 24 without interference from the first locking member 38 (see for example FIG. 6).

The first pin 24 and the first magnet 30 can present a first sub-assembly. Generally, the first sub-assembly is supported by the base 22. The first sub-assembly can include other components, such as, the first biasing member 36, the first locking member 38 and the first housing 40 as discussed above.

Referring to FIG. 3, in certain embodiments, the part holding assembly 14 can include a third locating feature, such as a second pin 42 extending outwardly away from the base 22 and spaced from the first pin 24. In certain embodiments, the second pin 42 is fixed to the base 22, and in other embodiments, the second pin 42 is coupled to the base 22 and is movable relative to the base 22. The second pin 42 extends to a distal end 44 that is spaced from the base 22. The base 22 is movable to position the second pin 42 relative to the first part 16 and to insert the distal end 44 of the second pin 42 through a fourth locating feature, such as a second hole 46 of the first part 16 to locate the first part 16. The base 22 can be movable by the attachment member 20 to position the second pin 42 relative to the first part 16 and to insert the distal end 44 of the second pin 42 through the second hole 46 of the first part 16 to locate the first part 16.

The third and fourth locating features are locations that are utilized to locate the first part 16. The third and fourth locating features can be any suitable configuration, with pins and holes being non-limiting examples. The fourth locating feature can be a hole 46, a slot, a corner, etc. For example, when utilizing the second hole 46 to locate the first part 16, the second hole 46 is not a hole that a fastener, a bolt, etc. is disposed through to secure the first part 16 to another part (such as the base part 18). In other words, the second hole 46 is only utilized for locating the first part 16. Therefore, the controller can be programmed to move the part holding assembly 14 to a particular position to locate the first part 16 via the second pin 42 and the second hole 46.

The second pin 42 is formed of a material that is substantially non-magnetic, such as for example, non-ferrous metal, austenitic stainless steel, aluminum, copper, etc. One suitable austenitic stainless steel for the second pin 42 is annealed, type 316 stainless steel.

Continuing with FIG. 3, the part holding assembly 14 can also include a second magnet 48 adjacent to the second pin 42. In certain embodiments, the second magnet 48 is movably coupled to the second pin 42. The second magnet 48 is selectively magnetized to selectively secure the position of the first part 16 relative to the base 22. Once the position of the first part 16 is secured relative to the base 22 by the magnetism of the second magnet 48, the robotic device can move the first part 16 to another position.

As mentioned above, the second magnet 48 is adjacent to the second pin 42, and therefore, the second pin 42 can be disposed through the second magnet 48 or the second magnet 48 can be disposed proximal to the second pin 42 in a spaced relationship. When the second pin 42 is disposed through the second magnet 48, the second magnet 48 can define a second opening 50 (see FIGS. 3 and 4). The second magnet 48 can abut the first part 16, or can be spaced from the first part 16, to secure the first part 16 to the part holding assembly 14. When the second magnet 48 is spaced from the first part 16, the magnetic field created by the second magnet 48, when magnetized, is strong enough to secure the first part 16 to the part holding assembly 14. The second magnet 48 can be magnetized by a second activator 51 (illustrated in FIG. 3), the first activator 33 or any suitable methods. One of the activators 33, 51 can be utilized to magnetize both the first and second magnets 30, 48. The second activator 51 can utilize an electrical current, can move the second magnet 48 toward and away from the first part 16 or be any other suitable activator to create magnetism between the first magnet 30 and the first part 16. The second activator 51 can turn on and off the magnetism of the second magnet 48, and/or can control the strength of magnetism of the second magnet 48. The second activator 51 can include a mechanical switch and/or dial, etc. to control the magnetism of the second magnet 48. The second activator 51 is only illustrated in FIG. 3 but all of the figures which illustrate the second magnet 48 can utilize the second activator 51. In certain embodiments, the second magnet 48 can be an electromagnet. The second pin 42 is formed of a material that is substantially non-magnetic such that the second pin 42 does not interfere with the magnetism of the second magnet 48.

Referring to FIG. 4, optionally, the part holding assembly 14 can further include a second biasing member 52 that applies a force to the second magnet 48 when the first part 16 is being located. The second biasing member 52 is disposed between the base 22 and the second magnet 48. As the second magnet 48 moves toward the base 22 when the second pin 42 is being inserted through the second hole 46, the second biasing member 52 applies the force to the second magnet 48 which causes engagement between the second magnet 48 and the first part 16, which can also be utilized to clamp the first part 16 to the base part 18 when the first part 16 is placed relative to the base part 18. The second biasing member 52 can be a biasing device with one or more components, a coil spring, a gas spring, a nitrogen gas spring, a die spring or any other suitable biasing member or spring. The second magnet 48 secures the first part 16 to the part holding assembly 14 from one side of the first part 16.

Optionally, the part holding assembly 14 can further include a second locking member 54 (see FIG. 4). The second locking member 54 is movable between a first position in which the second locking member 54 restricts the second magnet 48 from biasing back and forth relative to the second pin 42 and a second position that allows the second magnet 48 to bias back and forth relative to the second pin 42 when the first part 16 is being located. The second locking member 54 can move toward the second pin 42 when in the first position and the second locking member 54 can move away from the second pin 42 when in the second position. The second position of the second locking member 54 is shown in FIG. 4 and it is to be appreciated that the first position of the second locking member 54 is the same as illustrated for the first locking member 38 in FIG. 5. For example, the second locking member 54 can secure the second biasing member 52 in a predetermined position away from the second magnet 48 and the second position can release the second biasing member 52 such that the second biasing member 52 applies a force to the second magnet 48. Therefore, when the second locking member 54 is in the first position, in certain embodiments, the second biasing member 52 does not apply a force to the second magnet 48. It is to be appreciated that the second locking member 54 can include one or more components and be part of a device, a mechanism, an actuator, etc. Furthermore, the second locking member 54 can be any suitable location and configuration.

When switching from the second position back to the first position, the part holding assembly 14 can be disengaged from the first part 16 such that the second magnet 48 is disposed at a maximum distance from the base 22, and in this position, the second biasing member 52 can be expanded to its natural length such that there is no force applied to the second biasing member 52 that would cause the second biasing member 52 to be compressed. When the second biasing member 52 is expanded to its natural length and the second magnet 48 is disposed at its maximum distance from the base 22, the location of the second locking member 54 is between the end of the second biasing member 52 and the top of the second magnet 48 and can then be actuated back to its first position. Alternatively, the second biasing member 52 can be controlled to retract from the second magnet 48 when in the first position and release to at least partially decompress to apply the force to the second magnet 48 when in the second position.

Optionally, when utilizing the second biasing member 52, one or more seats can support the second biasing member 52. For example, one seat can be utilized to support one end of the second biasing member 52 and/or another seat can be utilized to support another end of the second biasing member 52. The seat(s) for the second biasing member 52 can be configured the same as the seats 37 for the first biasing member 52 and therefore, are not illustrated further. Any of the Figures illustrating the second biasing member 52 can utilize one or more seats.

As discussed above, the second locking member 54 is movable between the first position in which the second locking member 54 restricts the second magnet 48 from biasing back and forth relative to the second pin 42 and the second position that allows the second magnet 48 to bias back and forth relative to the second pin 42 when the first part 16 is being located. When utilizing a seat proximal to the second magnet 48, the second locking member 54 can engage the seat to restrict movement of the second magnet 48 when in the first position. Alternatively, when not utilizing the seat, the second locking member 54 can engage the second biasing member 52 to restrict movement of the second magnet 48 when in the first position.

The second biasing member 52 and the second locking member 54 are schematically shown in FIG. 4 and can be configured the same as illustrated in FIGS. 5 and 6, with the controller 39 in communication with the second locking member 54 and movable to the different positions as illustrated in FIGS. 5 and 6, and therefore will not be illustrated further. The second biasing member 52 can be a biasing device with one or more components, a coil spring, a gas spring, a nitrogen gas spring, a die spring or any other suitable biasing member or spring.

In other embodiments, the second biasing member 52 is coupled to the second magnet 48 and the second locking member 54 is eliminated. These embodiments are substantially the same as discussed above for the first biasing member 36 and the first magnet 30, and therefore, will not be illustrated further for the second biasing member 52/the second magnet 48. The second biasing member 52 retains the second magnet 48 relative to the second pin 42 and allows movement of the second magnet 48 relative to the second pin 42. The second biasing member 52 allows movement of the second magnet 48 so that the second pin 42 does not protrude excessively through the second hole 46 and/or the second aperture 58 in order to bring the second magnet 48 into direct contact or indirect engagement with the first part 16 or the base part 18. For example, the second magnet 48 can be biased outwardly by the second biasing member 52 to the distal end 44 of the second pin 42 before the second magnet 48 engages the first part 16. Once the second magnet 48 engages the first part 16, the robotic device can continue to move the part holding assembly 14 toward the first part 16 such that the second magnet 48 biases back which exposes the distal end 44 of the second pin 42 such that the second pin 42 can be inserted through the second hole 46. This movement allows the part holding assembly 14 to accommodate different thicknesses and/or different configurations of the first part 16, the base part 18 and other parts.

In yet other embodiments, the second locking member 54 can be a brake that is selectively actuated to engage the second pin 42 to secure the position of the second magnet 48 relative to the second pin 42. For example, the brake can be in the first position in which the second locking member 54 restricts the second magnet 48 from biasing back and forth relative to the second pin 42 and a second position that allows the second magnet 48 to bias back and forth relative to the second pin 42 when the first part 16 is being located. Therefore, the brake can be in the first position securing the second magnet 48 in a predetermined position and the brake can be in the second position releasing the second magnet 48 such that the second magnet 48 can bias in response to the second biasing member 52. The second magnet 48 is attached to the brake such that movement of the brake correspondingly moves the second magnet 48. In other words, the brake and the second magnet 48 are attached to each other to form a unit. When the second locking member 54 is the brake, at least a portion of the brake can engage the second pin 42 when in the first position to maintain the position of the brake, and thus the second magnet 48, relative to the second pin 42 and at least the portion of the brake can disengage from the second pin 42 when in the second position to allow the position of the brake to change, and thus the second magnet 48, relative to the second pin 42. This embodiment is substantially the same as discussed above for the first locking member 38 that is illustrated in FIG. 12, and therefore, FIG. 12 applies to the second locking member 54 and will not be illustrated further for the second locking member 54.

The second locking member 54 can be in communication with the controller 39 discussed above, or can be in communication with a second controller independent from the controller 39. The controller 39 or second controller can control the second locking member 54 to change the position of the brake and selectively secure the brake in a desired position relative to the second pin 42. Details of the controller 39 are discussed above and will not be re-discussed. When utilizing the second controller, the second controller can be part of an electronic control module.

When utilizing the second controller, the second controller includes a processor and a memory on which is recorded instructions for controlling the second locking member 54, etc. The second controller can control other components not specifically discussed herein and/or be in electrical communication with another controller, such as the controller 39. The second controller is configured to execute the instructions from the memory, via the processor. For example, the second controller can be a host machine or distributed system, e.g., a computer such as a digital computer or microcomputer, and/or as a proportional-integral-derivative (PID) controller device having a processor, and, as the memory, tangible, non-transitory computer-readable memory such as read-only memory (ROM) or flash memory. The second controller can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the second controller can include all software, hardware, memory, algorithms, connections, sensors, etc., necessary to control the second locking member 54, etc. As such, a control method operative to control the second locking member 54, etc. can be embodied as software or firmware associated with the second controller. It is to be appreciated that the second controller can also include any device capable of analyzing data from various sensors, comparing data, making the necessary decisions required to control and monitor the second locking member 54, etc. It is to also be appreciated that more than one controller can be utilized to control the components discussed above.

Continuing with FIGS. 3 and 4, the part holding assembly 14 can include a second housing 56 supported by the base 22. The second housing 56 can surround the second pin 42 and at least partially surround the second magnet 48. The distal end 44 of the second pin 42 can protrude outside of the second housing 56 in certain embodiments. The second magnet 48 is movable relative to the second pin 42. The second housing 56 can be attached to the base 22 by any suitable methods, such as for example, welding, integrally formed as one piece, adhesive, fasteners, etc., or the second housing 56 can be coupled to the base 22 and is movable relative to the base 22.

The second housing 56 can be attached to the second magnet 48 and can be flexible to allow the second magnet 48 to move relative to the second pin 42 (compare FIGS. 3 and 4). The second housing 56 can be formed of a fabric, a rubber or any other suitable material that is flexible. Alternatively, the second housing 56 can be formed of a rigid material, such as metal various plastics, etc. In yet other embodiments, the second housing 56 can be formed partially of a flexible material and partially of a rigid material. It is to be appreciated that the second housing 56 can be formed of any suitable material(s). The second housing 56 can be eliminated in the embodiment of FIG. 12.

For one of the second locking member 54 embodiments, the second locking member 54 is disposed inside the second housing 56 in the first position such that movement of the second magnet 48 relative to the second pin 42 can be impeded or restricted (the first position for the first locking member 38 is illustrated in FIG. 5, which also applies to the first position of the second locking member 54). The second locking member 54 retracts away from the inside of the second housing 56 when in the second position such that the second magnet 48 can move relative to the second pin 42 without interference from the second locking member 54 (see FIG. 4).

Referring to FIG. 4, the distal end 44 of the second pin 42 is inserted through the base part 18. Specifically, the base part 18 can also define a second aperture 58, with the distal end 26 of the first pin 24 inserted through the first aperture 34 and the distal end 44 of the second pin 42 inserted through the second aperture 58 to locate the first part 16 and the base part 18 relative to each other. Generally, the distal end 26, 44 of the first and second pins 24, 42 are inserted through the first and second apertures 34, 58 respectively after the distal end 26, 44 of the first and second pins 24, 42 are inserted through the first and second holes 28, 46 respectively. Therefore, the robotic device can move the first part 16 over the base part 18 with the part holding assembly 14 aligning the first part 16 and the base part 18 in the desired position.

The second pin 42 and the second magnet 48 can present a second sub-assembly spaced from the first sub-assembly. Generally, the second sub-assembly is supported by the base 22. The second sub-assembly can include other components, such as the second biasing member 52, the second locking member 54 and the second housing 56 as discussed above.

As discussed above, the first magnet 30 and the second magnet 48 can each be movable by different methods. For example, the first and second magnets 30, 48 can be movable by a spring bias. As another example, the first and second magnets 30, 48 can be movable by respective locking members 38, 54. As yet another example, the first and second magnets 30, 48 can be movable by the brake. It is to be appreciated that the first and second magnets 30, 48 can be movable by other methods as well, such as, a mechanical switch that activates/deactivates a mechanism/device/actuator, compressed air, an actuator, etc.

Figure 11:
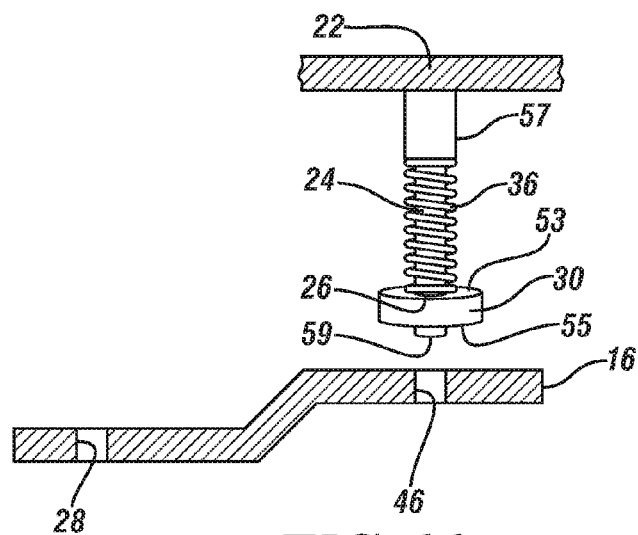
FIG. 11 is a schematic partial cross-sectional view of another configuration of the part holding assembly.

In yet another embodiment as shown in FIG. 11, the first magnet 30 can be attached to the first pin 24. Specifically, a first side 53 of the first magnet 30 is affixed to the distal end 26 of the first pin 24. As such, the first magnet 30 is not movable relative to the first pin 24. In this embodiment, the part holding assembly 14 can further include a distal pin 59 attached to a second side 55 of the first magnet 30. The first and second sides 53, 55 of the first magnet 30 oppose each other. The distal pin 59 extends away from the first magnet 30 and is selectively disposed in the first hole 28 and/or the first aperture 34 to locate the first part 16 and/or the base part 18. Therefore, in this embodiment, the distal end 26 of the first pin 24 is not inserted into the first hole 28 or the first aperture 34, and instead, the distal pin 59 is inserted into the first hole 28 and/or the first aperture 34. Furthermore, in this embodiment, an actuator 57 can be coupled to the first pin 24 and/or the base 22. The actuator 57 is selectively actuated to compress and de-compress the first biasing member 36 which changes the amount of force applied to the first side 53 of the first magnet 30 by the first biasing member 36. Changing the amount of force applied to the first magnet 30 by the first biasing member 36 can change the amount of force to clamp together the first part 16 and the base part 18. The actuator 57 can include a mechanical switch that activates/deactivates. The actuator 57 can be a mechanism/device that utilizes compressed air, etc. The actuator 57 can be in communication with a controller similar to the other controllers described herein and will not be re-discussed. The second magnet 48 can also be configured as described in FIG. 11. The first and second housings 40, 56 can be eliminated in the embodiment of FIG. 11.

In yet other embodiments, the first pin 24 can move relative to the first magnet 30 and the second pin 42 can move relative to the second magnet 48. Therefore, for example, the first magnet 30 can be stationary such that the first pin 24 moves relative to the first magnet 30. Similarly, for example, the second magnet 48 can be stationary such that the second pin 42 moves relative to the second magnet 48.

Figure 8:
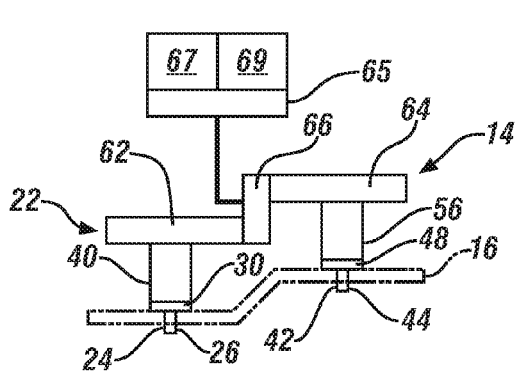
FIG. 8 is a schematic side view of the part holding assembly with the first part illustrated in phantom lines and having a second configuration, with a second plate segment adjusted relative to a first plate segment to change a linear position of a second pin relative to a first pin.
Figure 7:
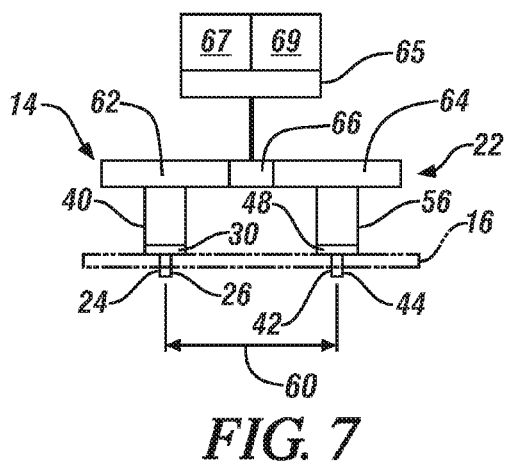
FIG. 7 is a schematic side view of the part holding assembly with the first part illustrated in phantom lines and having a first configuration.

In certain embodiments, optionally, the base 22 can be adjustable to change the position of the second pin 42 relative to the first pin 24 (see for example, FIGS. 7-8). Having the base 22 adjustable allows the part holding assembly 14 to accommodate different part configurations and different spacing of the holes 28, 46/the apertures 34, 58, since the spacing between the holes 28, 46/the apertures 34, 58 are not standardized on different parts. Therefore, the part holding assembly 14 provides adjustability which can save time and costs during the assembly process. The base 22 can be adjustable to change a linear position between the first and second sub-assemblies and/or to change a distance 60 between the first and second pins 24, 42. Furthermore, the base 22 can be adjustable to change the height of the first and/or second sub-assemblies (see for example, FIGS. 3 and 4). An actuator, etc. can be utilized to adjust the position of the first and/or second sub-assemblies.

Referring to FIGS. 7 and 8, for example, the base 22 can include a first plate segment 62 supporting the first sub-assembly and a second plate segment 64 supporting the second sub-assembly. In one embodiment, the second plate segment 64 is movable relative to the first plate segment 62 to change the position of the second pin 42 relative to the first pin 24. Therefore, the first plate segment 62 can be stationary in certain embodiments.

For example, the base 22 can include a joint 66 between the first and second plate segments 62, 64 to allow movement of the second plate segment 64 relative to the first plate segment 62. In this embodiment, the linear position of the second sub-assembly relative to the first sub-assembly is changed. It is to be appreciated that the linear position of the first sub-assembly can be changed instead of the second sub-assembly. The joint 66 can include an actuator, a mechanism, a device etc., to allow movement of one of the first and/or second sub-assemblies. For example, the joint 66 can include a linear slide.

The joint 66 can be in communication with a controller 65 (see FIGS. 7 and 8). The controller 65 can control the joint 66 to change the position of the second sub-assembly relative to the first sub-assembly, vice versa or change the positions of both the first and second sub-assemblies. The controller 65 can be part of an electronic control module. The controller 65 includes a processor 67 and a memory 69 on which is recorded instructions for controlling the joint 66, etc. The controller 65 can control other components not specifically discussed herein and/or be in electrical communication with one or more other controllers. The controller 65 is configured to execute the instructions from the memory 69, via the processor 67. For example, the controller 65 can be a host machine or distributed system, e.g., a computer such as a digital computer or microcomputer, and/or as a proportional-integral-derivative (PID) controller device having a processor, and, as the memory 69, tangible, non-transitory computer-readable memory such as read-only memory (ROM) or flash memory. The controller 65 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 65 can include all software, hardware, memory 69, algorithms, connections, sensors, etc., necessary to control the joint 66, etc. As such, a control method operative to control the joint 66, etc. can be embodied as software or firmware associated with the controller 65. It is to be appreciated that the controller 65 can also include any device capable of analyzing data from various sensors, comparing data, making the necessary decisions required to control and monitor the joint 66, etc. It is to also be appreciated that more than one controller 65 can be utilized to control the components discussed above.

Alternatively or in addition to, the height of the first and/or second sub-assemblies can be changed. Comparing FIGS. 3 and 4, the height of the first and second sub-assemblies are changed. In certain embodiments, the height of one of the sub-assemblies can change while the height of the other sub-assembly remains the same. In other embodiments, the height of the first and second sub-assemblies can both change. Specifically, the height of the first and second housings 40, 56 can change of the first and second sub-assemblies. As discussed above, the first and second housings 40, 56 can be flexible to allow the changes. Therefore, correspondingly, the positions of the first and second magnets 30, 48 relative to respective first and second pins 24, 42 change with the changes in height of respective first and second housings 40, 56.

Figure 13:
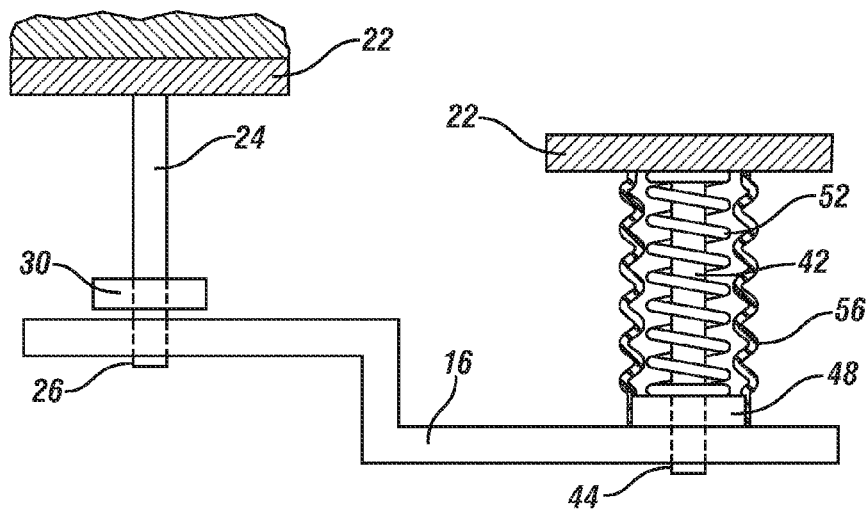
FIG. 13 is a schematic partial cross-sectional view of another configuration of the part holding assembly.

In another alternative, as shown in FIG. 13, a plurality of bases 22 can be utilized. One of the bases 22 supports the first sub-assembly and can be coupled to the support structure 12 such that the first sub-assembly remains stationary relative to the attachment member 20. Another one of the bases 22 supports the second sub-assembly and is adjustable relative to the support structure 12 such that the second sub-assembly can change positions relative to the attachment member 20. The adjustable base 22 can change the linear position between the first and second sub-assemblies and/or change the distance 60 between the first and second pins 24, 42.

Figure 9:
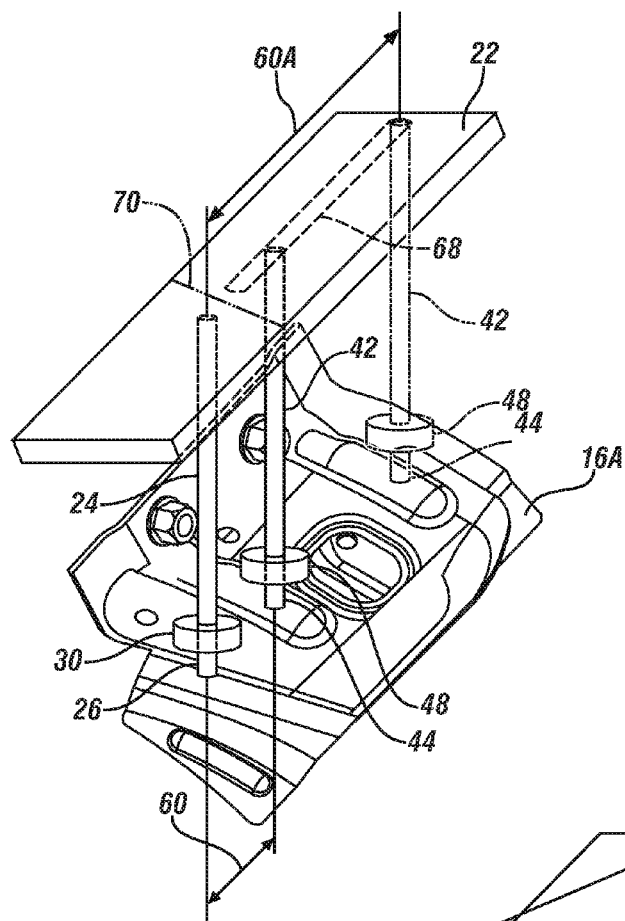
FIG. 9 is a schematic perspective view of the second pin being adjusted to a different location as illustrated in the phantom lines.
Figure 10:
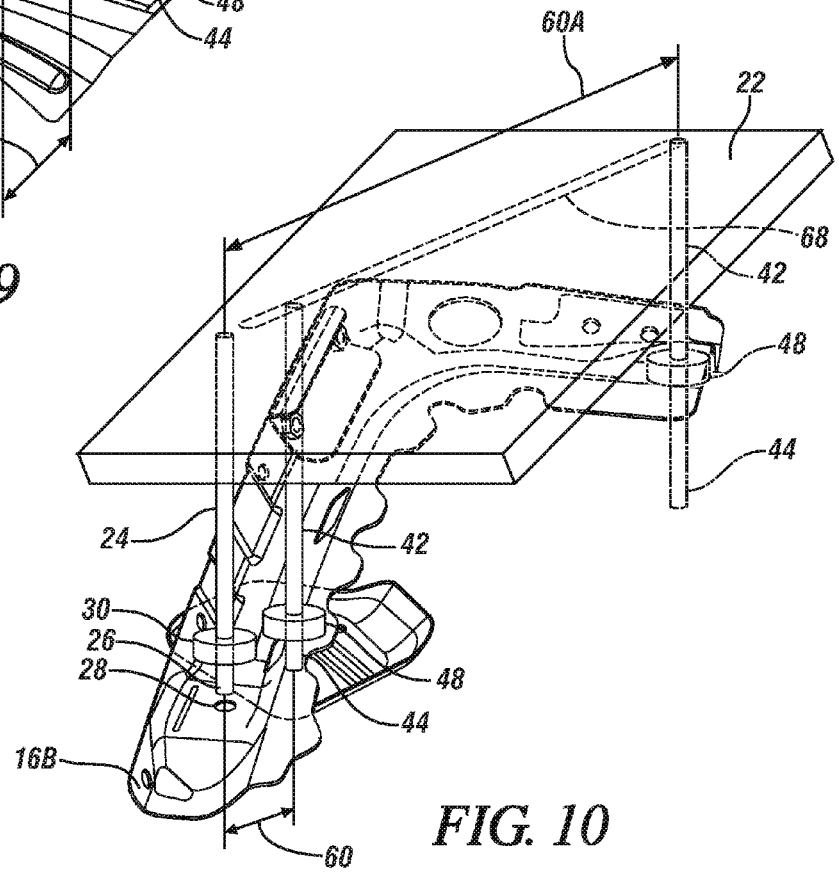
FIG. 10 is a schematic perspective view of the second pin being adjusted to a location different from FIG. 9 as illustrated in the phantom lines.

Referring to FIGS. 9 and 10, the distance 60 between the first and second pins 24, 42 can be changed to accommodate different parts 16A, 16B having different spacing between the first and second holes 28, 46, etc. For illustrative purposes only, the first and second sub-assemblies have been simplified in FIGS. 9 and 10 to only illustrate the pins 24, 42 and the magnets 30, 48 but can include any of the features discussed above. In FIGS. 9 and 10, the original position of the second pin 42 is shown in solid lines and the new (adjusted) position of the second pin 42 relative to the first pin 24 is shown in phantom lines, i.e., dash-dot-dash lines. Therefore, in certain embodiments, the first pin 24 can be stationary while the second pin 42 changes position.

The distance 60 between the first and second pins 24, 42 can be changed by utilizing the joint 66 or the base 22 can include a track 68 (see FIGS. 9 and 10). In one embodiment, the second plate segment 64 of the base 22 can include the track 68. The phantom lines 70 through the base 22 in FIG. 9 is to illustrate the option of splitting the base 22 by the joint 66 into the first plate segment 62 and the second plate segment 64. The second pin 42 can be coupled to the track 68 and the second pin 42 can be movable along the track 68 to change the position of the second pin 42 relative to the first pin 24. Therefore, the second pin 42 can move toward or away from the first pin 24 to change the distance 60 between the first and second pins 24, 42. Specifically, in one embodiment, the second sub-assembly can move along the track 68 to change the distance 60 between the first sub-assembly and the second sub-assembly. In other embodiments, the track 68 can be disposed along the first plate segment 62 instead of the second plate segment 64 such that the first pin 24 is movable relative to the second pin 42. In yet other embodiments, the first plate segment 62 and the second plate segment 64 can each include separate tracks 68. As such, if the second pin 42 is movable along the track 68 and the second housing 56 is being utilized, the second housing 56 can correspondingly move with the second pin 42 along the track 68. Similarly, if the first pin 24 is movable along the track 68 and the first housing 40 is being utilized, the first housing 40 can correspondingly move with the first pin 24.

Furthermore, being able to change the distance 60 between the first and second pins 24, 42 can optionally apply a force to the first part 16 at the first and second holes 28, 46 to also secure the position of the first part 16 on the part holding assembly 14. Therefore, once the first and second pins 24, 42 are inserted into the first and second holes 28, 46 respectively, one or both of the pins 24, 42 can move along respective tracks 68 to apply the force to the first part 16 within the holes 28, 46. One or both of the pins 24, 42 can move away from each other or toward each other to apply the force to the first part 16 at the holes 28, 46. Therefore, the pins 24, 42 can grip the first part 16, etc. Once the pins 24, 42 are positioned as desired, the first and/or second magnets 30, 48 can be magnetized to hold the first part 16. It is to be appreciated that the diameter of the first pin 24 can be adjusted to accommodate different diameters of the first hole 28 and/or the first aperture 34. Similarly, it is to be appreciated that the diameter of the second pin 42 can be adjusted to accommodate different diameters of the second hole 46 and/or the second aperture 58.

It is to be appreciated more than two pins 24, 42 can be utilized. Therefore, more than two sub-assemblies can be supported by the base 22, which can include the features discussed above for one of the sub-assemblies. When utilizing more than two pins 24, 42, more than two holes 28, 46 can be defined in the first part 16 and more than two apertures 34, 58 can be defined in the base part 18. Generally, the first part 16 and the base part 18 are formed of metal. Specifically, the metal is a material that is attractable to the first and second magnets 30, 48 to secure that part 16 to the part holding assembly 14. In other words, the material of the first part 16 and the base part 18 is attracted to magnetism. For example, the metal can be steel. Generally, the first part 16 and the base part 18 can be steel sheet metal.

The present disclosure also provides a method of positioning the first part 16. The method includes positioning the part holding assembly 14 relative to the first part 16. The part holding assembly 14 can include the components/features discussed above, some of which are discussed below. For example, the part holding assembly 14 can include the base 22, the first pin 24 extending outwardly away from the base 22 to the distal end 26 that is spaced from the base 22, and the first magnet 30 adjacent to the first pin 24, etc.

The method further includes inserting the distal end 26 of the first pin 24 through the first hole 28 of the first part 16 to locate the first part 16 and magnetizing the first magnet 30 to secure the first part 16 to the part holding assembly 14. During inserting the distal end 26 of the first pin 24 through the first hole 28, the first magnet 30 is de-magnetized. Furthermore, when utilizing the first locking member 38, before inserting the distal end 26 of the first pin 24 through the first hole 28, the first locking member 38 is in the first position. In certain embodiments, the first magnet 30 is biased back along the first pin 24 during insertion of the distal end 26 of the first pin 24 through the first hole 28. Once the desired insertion distance of the distal end 26 of the first pin 24 is reached through the first hole 28, the position of the first magnet 30 can be maintained relative to the first pin 24 by the first locking member 38, such as by the brake.

In certain embodiments, as discussed above, the second sub-assembly can be supported by the base 22. Therefore, the method can further include inserting the distal end 44 of the second pin 42 through the second hole 46 of the first part 16 to locate the first part 16 and magnetizing the second magnet 48 to secure the first part 16 to the part holding assembly 14. During inserting the distal end 44 of the second pin 42 through the second hole 46, the second magnet 48 is de-magnetized. Furthermore, when utilizing the second locking member 54, before inserting the distal end 44 of the second pin 42 through the second hole 46, the second locking member 54 is in the first position. In certain embodiments, the second magnet 48 is biased back along the second pin 42 during insertion of the distal end 44 of the second pin 42 through the second hole 46. Once the desired insertion distance of the distal end 44 of the second pin 42 is reached through the second hole 46, the position of the second magnet 48 can be maintained relative to the second pin 42 by the second locking member 54, such as by the brake.

As discussed above, the second magnet 48 is movably coupled to the second pin 42. The first and second magnets 30, 48 are not magnetized when inserting the distal ends 26, 44 of the first and second pins 24, 42 through respective holes 28, 46. Therefore, inserting the distal ends 26, 44 of the first and second pins 24, 42 through respective holes 28, 46 occurs before magnetizing the first and second magnets 30, 48. As such, the first part 16 is located before securing the first part 16 to the part holding assembly 14.

After locating the first part 16 by the first and second pins 24, 42, the first and second magnets 30, 48 are magnetized to secure the position of the first part 16 relative to the base 22 and then the first part 16 can be moved to another desired position by the robotic device. For example, the magnets 30, 48 can be magnetized by the first activator 33, or in another embodiment, the magnets 30, 48 can be magnetized by separate activators, i.e., the first and second activators 33, 51 respectively. The first and second magnets 30, 48 can be magnetized at the same time, i.e., simultaneously, or one before the other. The strength of the magnetism of the first and/or second magnets 30, 48 can be changed, i.e., increased or decreased, as desired. In certain embodiments, for example, each of the magnets 30, 48 can create from about 25.0 pound-force to about 140.0 pound-force of pull on, for example, the first part 16 when these magnets 30, 48 are magnetized to secure the first part 16 to the part holding assembly 14. Each of the magnets 30, 48 define about a 2.0 inch diameter and about a 1.0 inch thickness, with the magnets 30, 48 directly contacting the first part 16, to create the pound-force range immediately above.

As also discussed above, the location of the first and second pins 24, 42 relative to each other can be changed. For example, the second pin 42 can be changed relative to the first pin 24. Therefore, in this embodiment, the method can also include moving the second plate segment 64 of the base 22 relative to the first plate segment 62 of the base 22 to change the position of the second pin 42 relative to the first pin 24. More specifically, moving the second plate segment 64 relative to the first plate segment 62 can include changing the linear position of the second pin 42 relative to the first pin 24. The method can also include moving the second pin 42 relative to the base 22 to change the distance 60 between the first and second pins 24, 42. Therefore, the second pin 42 can move in various directions relative to the first pin 24. For example, the second pin 42 can move forward or backward linearly relative to the first pin 24 (compare FIGS. 7 and 8). As another example, the second pin 42 can move toward or away from the first pin 24 to change the distance 60 between the first and second pins 24, 42 (see FIGS. 9 and 10). The original distance is labeled as reference number 60 and the changed distance is labeled as reference number 60A in FIGS. 9 and 10.

The method can further include inserting the distal end 26 of the first pin 24 through the first aperture 34 of the base part 18 and inserting the distal end 44 of the second pin 42 through the second aperture 58 of the base part 18 to locate the base part 18. In certain embodiments, inserting the distal end 26 of the first pin 24 through the first aperture 34 of the base part 18 and inserting the distal end 44 of the second pin 42 through the second aperture 58 of the base part 18 occurs after inserting the distal end 26 of the first pin 24 through the first hole 28 of the first part 16 and inserting the distal end 44 of the second pin 42 through the second hole 46 of the first part 16. Therefore, in this embodiment, the first part 16 is located and positioned relative to the base part 18.

As the first part 16 is being located relative to the base part 18, the strength of the magnetism of the first and second magnets 30, 48 can be reduced to facilitate smooth or fluent contact between the first part 16 and the base part 18. Once the first part 16 is located relative to the base part 18, the first part 16 and the base part 18 can be clamped together with the part holding assembly 14. Therefore, the method can also include biasing the first and second magnets 30, 48 toward the first part 16 to transfer the force from the first part 16 to the base part 18 to clamp the first part 16 and the base part 18 together. Biasing the first and second magnets 30, 48 toward the first part 16 can include moving the first locking member 38 to the second position which releases the first biasing member 36 and moving the second locking member 54 to the second position which releases the second biasing member 52. In the brake embodiment, the brake releases from the first pin 24 and the first magnet 30 can move along the first pin 24, and similarly, the same occurs with the second magnet 48 relative to the second pin 42. Therefore, the first and second biasing members 36, 52 apply the force to the first and second magnets 30, 48 respectively which transfers the force from the first part 16 to the base part 18 to clamp these parts 16, 18 together.

The first and second magnets 30, 48 are de-magnetized before moving the first and second locking members 38, 54 to respective second positions. Furthermore, the first and second magnets 30, 48 can be de-magnetized when clamping the first part 16 and the base part 18 together with the first and second biasing members 36, 52. Once the first part 16 and the base part 18 are clamped together, the first locking member 38 and the second locking member 54 can be actuated from respective second positions back to respective first positions to secure respective first and second magnets 30, 48 in the desired position relative to respective first and second pins 24, 42. Furthermore, after the first part 16 and the base part 18 are clamped together, the strength of magnetism of the first and/or second magnets 30, 48 can be increased or decreased as desired. The first part 16 and the base part 18 are clamped together from one side by the part holding assembly 14. For example, the amount of force utilized to clamp the first part 16 and the base part 18 together can be from about 50.0 pound-force to about 100.0 pound-force.

In addition to or alternatively, a force sensor or a force control device can be utilized to determine the amount of force clamping the first part 16 and the base part 18 together. The first part 16 and the base part 18 can remain clamped together by the part holding assembly 14 until these parts 16, 18 are welded together, adhered or clamped with fasteners for another subsequent assembly process. It is to be appreciated that the robotic device can also apply a force on the first part 16 to assist with subsequent assembly processes. Once the first part 16 is secured to the base part 18 in a subsequent assembly process, the first and second magnets 30, 48 can be de-magnetized and the part holding assembly 14 can be retracted from these parts 16, 18 and the first and second locking members 38, 54 can be actuated from respective first positions to respective second positions to allow movement of the magnets 30, 48 along respective first and second pins 24, 42.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A part holding assembly coupleable to a support structure, the assembly comprising:
a base adapted to be coupled to the support structure;
a first pin extending outwardly away from the base to a distal end that is spaced from the base, with the base movable to position the first pin relative to a first part and to insert the distal end of the first pin through a first hole of the first part to locate the first part;
a first magnet adjacent to the first pin and selectively magnetized to selectively secure the position of the first part relative to the base;
wherein the base includes a track; and
a second pin coupled to the track, with the second pin movable along the track to change the position of the second pin relative to the first pin.

2. The assembly as set forth in claim 1 further including a first biasing member that applies a force to the first magnet when the first part is being located.

3. The assembly as set forth in claim 2 further including a first locking member movable between a first position in which the first locking member restricts the first magnet from biasing back and forth relative to the first pin and a second position that allows the first magnet to bias back and forth relative to the first pin when the first part is being located, and wherein the first biasing member is disposed between the base and the first magnet, with the first pin disposed through the first magnet and the first magnet is movable relative to the first pin.

4. The assembly as set forth in claim 1 wherein the second pin extends outwardly away from the base and is spaced from the first pin, with the second pin extending to a distal end that is spaced from the base, with the base movable to position the second pin relative to the first part and to insert the distal end of the second pin through a second hole of the first part to locate the first part.

5. The assembly as set forth in claim 4:
further including a second magnet adjacent to the second pin and selectively magnetized to selectively secure the position of the first part relative to the base; and
further including a second biasing member that applies a force to the second magnet when the first part is being located.

6. The assembly as set forth in claim 5 further including a second locking member movable between a first position in which the second locking member restricts the second magnet from biasing back and forth relative to the second pin and a second position that allows the second magnet to bias back and forth relative to the second pin when the first part is being located, and wherein the second biasing member is disposed between the base and the second magnet, with the second pin disposed through the second magnet and the second magnet is movable relative to the second pin.

7. The assembly as set forth in claim 1:
wherein the first pin and the first magnet present a first sub-assembly;
wherein the second pin extends outwardly away from the base and is spaced from the first pin, with the second pin extending to a distal end that is spaced from the base, with the base movable to position the second pin relative to the first part and to insert the distal end of the second pin through a second hole of the first part to locate the first part;
further including a second magnet adjacent to the second pin and selectively magnetized to selectively secure the position of the first part relative to the base; and
wherein the second pin and the second magnet present a second sub-assembly spaced from the first sub-assembly.

8. The assembly as set forth in claim 7 wherein the base includes a first plate segment supporting the first sub-assembly and a second plate segment supporting the second sub-assembly, with the second plate segment movable relative to the first plate segment to change the position of the second pin relative to the first pin.

9. The assembly as set forth in claim 8 wherein the base includes a joint between the first and second plate segments to allow movement of the second plate segment relative to the first plate segment.

10. The assembly as set forth in claim 8 wherein the second plate segment of the base includes the track, with the second pin coupled to the track and movable along the track to change the position of the second pin relative to the first pin.

11. An assembly system comprising:
a support structure including an attachment member;
a part holding assembly coupled to the attachment member, the assembly including:
  a base secured to the attachment member;
  a first pin extending outwardly away from the base to a distal end that is spaced from the base, with the base movable by the attachment member to position the first pin relative to a first part and to insert the distal end of the first pin through a first hole of the first part to locate the first part;
  a first magnet adjacent to the first pin and selectively magnetized to selectively secure the position of the first part relative to the base; and
  a second pin extending outwardly away from the base and spaced from the first pin, with the second pin extending to a distal end that is spaced from the base, and with the base movable to position the second pin relative to the first part and to insert the distal end of the second pin through a second hole of the first part to locate the first part.

12. The system as set forth in claim 11 wherein the base includes a track, with the second pin coupled to the track, and with the second pin movable along the track to change the position of the second pin relative to the first pin.

13. The system as set forth in claim 11 further including a base part defining a first aperture, with the distal end of the first pin inserted through the first aperture to locate the first part and the base part relative to each other.

14. A method of positioning a first part, the method comprising:
positioning a part holding assembly relative to the first part, with the part holding assembly including a base, a first pin extending outwardly away from the base to a distal end that is spaced from the base, and a first magnet adjacent to the first pin, with the base movable to position the first pin relative to the first part;
inserting the distal end of the first pin through a first hole of the first part to locate the first part;
magnetizing the first magnet to secure the first part to the part holding assembly; and
inserting a distal end of a second pin through a second hole of the first part to locate the first part.

15. The method as set forth in claim 14 further comprising magnetizing a second magnet to secure the first part to the part holding assembly, with the second magnet adjacent to the second pin.

16. The method as set forth in claim 14 further comprising moving a second plate segment of the base relative to a first plate segment of the base to change the position of the second pin relative to the first pin.

17. The method as set forth in claim 14 further comprising inserting the distal end of the first pin through a first aperture of a base part and inserting the distal end of the second pin through a second aperture of the base part to locate the base part and wherein inserting the distal end of the first pin through the first aperture of the base part and inserting the distal end of the second pin through the second aperture of the base part occurs after inserting the distal end of the first pin through the first hole of the first part and inserting the distal end of the second pin through the second hole of the first part.

18. The method as set forth in claim 17 further comprising biasing the first and second magnets toward the first part to transfer a force from the first part to the base part to clamp the first part and the base part together.

19. The method as set forth in claim 14 further comprising moving the second pin relative to the base to change a distance between the first and second pins.

* * * * *